ROBERT M. McGRATH.

Improvement in Dumping Apparatus.

No. 115,759.

Patented June 6, 1871.

Witnesses
Geo. C. Lambright
Robert Everett

Inventor
Robert M. McGrath
by Atty Thos. T. Everett 115,759

UNITED STATES PATENT OFFICE.

ROBERT M. McGRATH, OF LA FAYETTE, INDIANA.

IMPROVEMENT IN DUMPING APPARATUS.

Specification forming part of Letters Patent No. 115,759, dated June 6, 1871.

I, ROBERT M. McGRATH, of La Fayette, in the State of Indiana, have invented a certain Improvement in Grain-Dumps, of which the following is a specification:

This invention has reference to that class of dumps used at points of delivery where the grain is brought in bulk, generally in wagons; and is intended to facilitate the delivery of the grain from the wagon to the hopper or chute, or such other device or means as may be used to receive the grain and convey it to the bin or such other place as may be desired.

Figure 1:
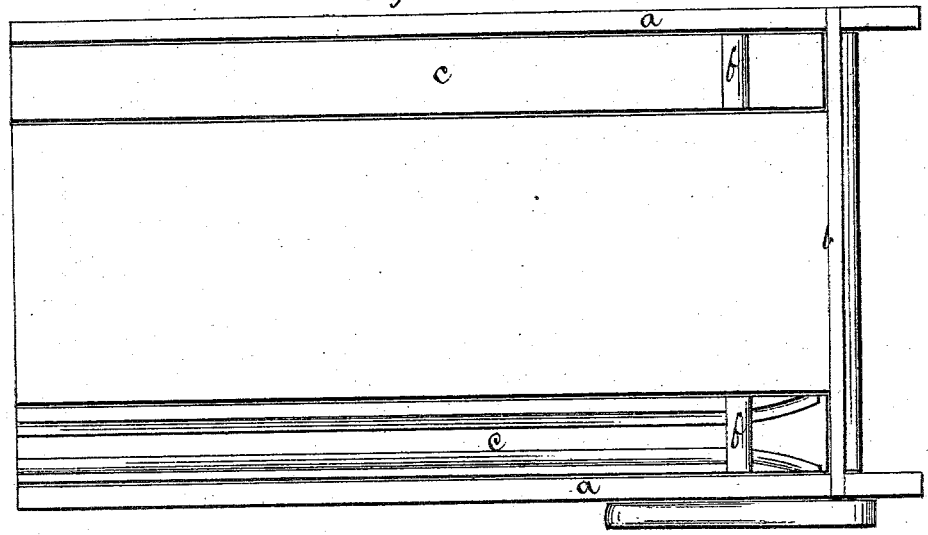
Figure 2:
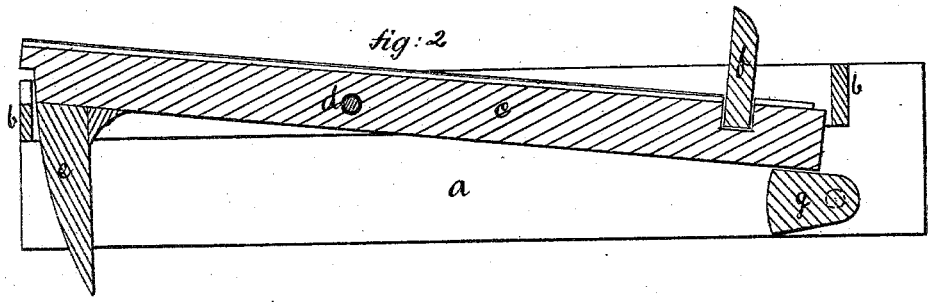
Figure 3:
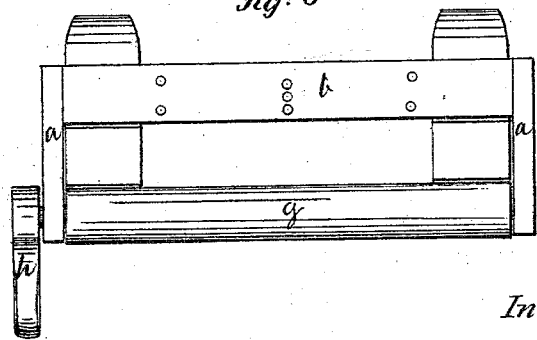

The accompanying drawing represents a dump constructed under my invention—Figure 1 being a top view; Fig. 2, a view by longitudinal section; and Fig. 3, a view of the dumping end.

$a$ indicates the side pieces of the frame of the dumper, and $b$ the end pieces, properly secured to each other. To the side pieces the pieces forming the track $c$ are pivoted at $d$, as shown by Fig. 2, the track being also pivoted to the platform. Attached to the outer ends of the track are guides $e$, projecting downward, which guides are of the proper weight to balance the track. At the inner ends of the track pieces are socketed the upright chucks $f$. These chucks can be taken out until the wagon is on the track, when they can be inserted and the wagon locked to them or against them. Pivoted to the inner end of the side pieces is the bar $g$, having the lever $h$. When this bar is vertical it supports the inner ends of the track, and when the wagon is in the proper position for being dumped the lever is moved backward, by which movement the back end of the wagon is dumped and the grain allowed to run out. This position of the bar and the ends of the track is shown by Fig. 2. When the grain is delivered and the wagon drawn off the track the bar is again placed in a vertical position and the dumper is ready for further use.

This dump can readily be placed in the proper position for use at any station, or mill, or storehouse.

I claim as my invention—

A grain-dump, having the pivoted track with the weight-guides $e$, lever $h$, and bar $g$, arranged and operated as herein set forth.

This specification signed this 4th day of April, 1871.

ROBERT M. McGRATH.

Witnesses:
J. H. GALLAGHER,
KONRED KLINNSAND.